United States Patent
Kyrtsos et al.

(10) Patent No.: US 9,804,022 B2
(45) Date of Patent: Oct. 31, 2017

(54) SYSTEM AND METHOD FOR HITCH ANGLE DETECTION

(71) Applicant: Ford Global Technologies, LLC, Dearborn, MI (US)

(72) Inventors: Christos Kyrtsos, Beverly Hills, MI (US); Thomas Edward Pilutti, Ann Arbor, MI (US); Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 283 days.

(21) Appl. No.: 14/666,491

(22) Filed: Mar. 24, 2015

(65) Prior Publication Data

US 2016/0280261 A1    Sep. 29, 2016

(51) Int. Cl.
| | |
|---|---|
| *G01M 17/06* | (2006.01) |
| *G01H 17/00* | (2006.01) |
| *G01B 17/00* | (2006.01) |
| *G01B 21/24* | (2006.01) |
| *B62D 13/00* | (2006.01) |
| *B60D 1/24* | (2006.01) |
| *B60D 1/62* | (2006.01) |

(52) U.S. Cl.
CPC ............ *G01H 17/00* (2013.01); *B60D 1/245* (2013.01); *B60D 1/62* (2013.01); *B62D 13/00* (2013.01); *G01B 17/00* (2013.01); *G01B 21/24* (2013.01)

(58) Field of Classification Search
USPC ......................................... 73/117.01, 117.02
See application file for complete search history.

(56) References Cited

U.S. PATENT DOCUMENTS

| | | |
|---|---|---|
| 3,542,390 A | 11/1970 | Fikes et al. |
| 3,605,088 A | 9/1971 | Savelli |
| 3,787,077 A | 1/1974 | Sanders |
| 3,833,928 A | 9/1974 | Gavit et al. |
| 3,860,257 A | 1/1975 | Mesley |
| 4,040,006 A | 8/1977 | Kimmel |
| 4,042,132 A | 8/1977 | Bohman et al. |
| 4,122,390 A | 10/1978 | Kollitz et al. |
| 4,212,483 A | 7/1980 | Howard |

(Continued)

FOREIGN PATENT DOCUMENTS

| | | |
|---|---|---|
| CN | 102582686 B | 9/2013 |
| DE | 3923676 A1 | 1/1991 |

(Continued)

OTHER PUBLICATIONS

"Ford Super Duty: Truck Technologies", Brochure, Sep. 2011, 2 pages.

(Continued)

*Primary Examiner* — Eric S McCall
(74) *Attorney, Agent, or Firm* — Raymond Coppiellie; Price Heneveld LLP

(57) ABSTRACT

A hitch angle detection system is provided herein. Ultrasonic transducers are disposed on a rear vehicle structure and are configured to transmit ultrasonic waves in a rearward vehicle direction. An ultrasonic reflector is disposed on a trailer and is configured to reflect incident ultrasonic waves back toward the corresponding ultrasonic transducers. A processor is configured to derive distance measurements between the ultrasonic transducers and the ultrasonic reflector and determine a hitch angle based on the derived distance measurements.

19 Claims, 3 Drawing Sheets

(56) References Cited

U.S. PATENT DOCUMENTS

| | | |
|---|---|---|
| 4,366,966 A | 1/1983 | Ratsko et al. |
| 4,735,432 A | 4/1988 | Brown |
| 4,752,080 A | 6/1988 | Rogers |
| 4,848,499 A | 7/1989 | Martinet et al. |
| 4,852,901 A | 8/1989 | Beasley et al. |
| 4,943,080 A | 7/1990 | Reimer |
| 5,001,639 A | 3/1991 | Breen |
| 5,056,905 A | 10/1991 | Jensen |
| 5,097,250 A | 3/1992 | Hernandez |
| 5,108,123 A | 4/1992 | Rubenzik |
| 5,108,158 A | 4/1992 | Breen |
| 5,132,851 A | 7/1992 | Bomar et al. |
| 5,152,544 A | 10/1992 | Dierker, Jr. et al. |
| 5,191,328 A | 3/1993 | Nelson |
| 5,244,226 A | 9/1993 | Bergh |
| 5,246,242 A | 9/1993 | Penzotti |
| 5,247,442 A | 9/1993 | Kendall |
| 5,282,641 A | 2/1994 | McLaughlin |
| 5,289,892 A | 3/1994 | Notsu |
| 5,290,057 A | 3/1994 | Pellerito |
| 5,455,557 A | 10/1995 | Noll et al. |
| 5,521,633 A | 5/1996 | Nakajima et al. |
| 5,523,947 A | 6/1996 | Breen |
| 5,541,778 A | 7/1996 | DeFlorio |
| 5,558,350 A | 9/1996 | Kimbrough et al. |
| 5,559,696 A | 9/1996 | Borenstein |
| 5,579,228 A | 11/1996 | Kimbrough et al. |
| 5,631,656 A | 5/1997 | Hartman et al. |
| 5,650,764 A | 7/1997 | McCullough |
| 5,690,347 A | 11/1997 | Juergens et al. |
| 5,719,713 A | 2/1998 | Brown |
| 5,747,683 A | 5/1998 | Gerum et al. |
| 5,821,852 A | 10/1998 | Fairchild |
| 5,980,048 A | 11/1999 | Rannells, Jr. et al. |
| 6,041,582 A | 3/2000 | Tiede et al. |
| 6,042,196 A | 3/2000 | Nakamura et al. |
| 6,124,709 A | 9/2000 | Allwine |
| 6,151,175 A | 11/2000 | Osha |
| 6,198,992 B1 | 3/2001 | Winslow |
| 6,217,177 B1 | 4/2001 | Rost |
| 6,218,828 B1 | 4/2001 | Bates et al. |
| 6,223,104 B1 | 4/2001 | Kamen et al. |
| 6,223,114 B1 | 4/2001 | Boros et al. |
| 6,268,800 B1 | 7/2001 | Howard |
| 6,292,094 B1 | 9/2001 | Deng et al. |
| 6,351,698 B1 | 2/2002 | Kubota et al. |
| 6,472,865 B1 | 10/2002 | Tola et al. |
| 6,480,104 B1 | 11/2002 | Wall et al. |
| 6,483,429 B1 | 11/2002 | Yasui et al. |
| 6,494,476 B2 | 12/2002 | Masters et al. |
| 6,498,977 B2 | 12/2002 | Wetzel et al. |
| 6,539,288 B2 | 3/2003 | Ishida et al. |
| 6,568,093 B2 | 5/2003 | Kogiso et al. |
| 6,577,952 B2 | 6/2003 | Geier et al. |
| 6,668,225 B2 | 12/2003 | Oh et al. |
| 6,712,378 B1 | 3/2004 | Austin |
| 6,801,125 B1 | 10/2004 | McGregor et al. |
| 6,806,809 B2 | 10/2004 | Lee et al. |
| 6,820,888 B1 | 11/2004 | Griffin |
| 6,838,979 B2 | 1/2005 | Deng et al. |
| 6,854,557 B1 | 2/2005 | Deng et al. |
| 6,857,494 B2 | 2/2005 | Kobayashi et al. |
| 6,879,240 B2 | 4/2005 | Kruse |
| 6,956,468 B2 | 10/2005 | Lee et al. |
| 6,959,970 B2 | 11/2005 | Tseng |
| 6,999,856 B2 | 2/2006 | Lee et al. |
| 7,005,974 B2 | 2/2006 | McMahon et al. |
| 7,006,127 B2 | 2/2006 | Mizusawa et al. |
| 7,008,088 B2 | 3/2006 | Pisciotti |
| 7,028,804 B2 | 4/2006 | Eki et al. |
| 7,032,705 B2 | 4/2006 | Zheng et al. |
| 7,046,127 B2 | 5/2006 | Boddy |
| 7,058,493 B2 | 6/2006 | Inagaki |
| 7,089,101 B2 | 8/2006 | Fischer et al. |
| 7,154,385 B2 | 12/2006 | Lee et al. |
| 7,159,890 B2 | 1/2007 | Craig et al. |
| 7,167,785 B2 | 1/2007 | Lohberg et al. |
| 7,170,285 B2 | 1/2007 | Spratte |
| 7,171,330 B2 | 1/2007 | Kruse et al. |
| 7,204,504 B2 | 4/2007 | Gehring et al. |
| 7,219,913 B2 | 5/2007 | Atley |
| 7,225,891 B2 | 6/2007 | Gehring et al. |
| 7,229,139 B2 | 6/2007 | Lu et al. |
| 7,239,958 B2 | 7/2007 | Grougan et al. |
| 7,269,489 B2 | 9/2007 | Deng et al. |
| 7,272,481 B2 | 9/2007 | Einig et al. |
| 7,295,907 B2 | 11/2007 | Lu et al. |
| 7,401,871 B2 | 7/2008 | Lu et al. |
| 7,405,557 B2 | 7/2008 | Spratte et al. |
| 7,413,266 B2 | 8/2008 | Lenz et al. |
| 7,425,889 B2 | 9/2008 | Widmann et al. |
| 7,447,585 B2 | 11/2008 | Tandy, Jr. et al. |
| 7,451,020 B2 | 11/2008 | Goetting et al. |
| 7,463,137 B2 | 12/2008 | Wishart et al. |
| 7,504,995 B2 | 3/2009 | Lawrence et al. |
| 7,532,109 B2 | 5/2009 | Takahama et al. |
| 7,540,523 B2 | 6/2009 | Russell et al. |
| 7,548,155 B2 | 6/2009 | Schutt et al. |
| 7,568,716 B2 | 8/2009 | Dietz |
| 7,623,952 B2 | 11/2009 | Unruh et al. |
| 7,648,153 B2 | 1/2010 | Metternich et al. |
| 7,690,737 B2 | 4/2010 | Lu |
| 7,715,953 B2 | 5/2010 | Shepard |
| 7,731,302 B2 | 6/2010 | Tandy, Jr. et al. |
| 7,793,965 B2 | 9/2010 | Padula |
| 7,798,263 B2 | 9/2010 | Tandy, Jr. et al. |
| 7,878,545 B2 | 2/2011 | Rhymer et al. |
| 7,904,222 B2 | 3/2011 | Lee et al. |
| 7,905,507 B2 | 3/2011 | Perri |
| 7,950,751 B2 | 5/2011 | Offerle et al. |
| 7,953,536 B2 | 5/2011 | Katrak |
| 7,974,444 B2 | 7/2011 | Hongo |
| 8,010,252 B2 | 8/2011 | Getman et al. |
| 8,010,253 B2 | 8/2011 | Lundquist |
| 8,036,792 B2 | 10/2011 | Dechamp |
| 8,038,166 B1 | 10/2011 | Piesinger |
| 8,044,779 B2 | 10/2011 | Hahn et al. |
| 8,073,594 B2 | 12/2011 | Lee et al. |
| 8,157,284 B2 | 4/2012 | McGhie et al. |
| 8,165,770 B2 | 4/2012 | Getman et al. |
| 8,167,444 B2 | 5/2012 | Lee et al. |
| 8,170,726 B2 | 5/2012 | Chen et al. |
| 8,174,576 B2 | 5/2012 | Akatsuka et al. |
| 8,180,543 B2 | 5/2012 | Futamura et al. |
| 8,190,364 B2 | 5/2012 | Rekow |
| 8,191,915 B2 | 6/2012 | Freese et al. |
| 8,192,036 B2 | 6/2012 | Lee et al. |
| 8,215,436 B2 | 7/2012 | DeGrave et al. |
| 8,223,204 B2 | 7/2012 | Hahn |
| 8,244,442 B2 | 8/2012 | Craig et al. |
| 8,260,518 B2 | 9/2012 | Englert |
| 8,267,485 B2 | 9/2012 | Barlsen et al. |
| 8,280,607 B2 | 10/2012 | Gatti et al. |
| 8,308,182 B2 | 11/2012 | Ortmann et al. |
| 8,326,504 B2 | 12/2012 | Wu et al. |
| 8,342,560 B2 | 1/2013 | Albers et al. |
| 8,380,390 B2 | 2/2013 | Sy et al. |
| 8,380,416 B2 | 2/2013 | Offerle et al. |
| 8,393,632 B2 | 3/2013 | Vortmeyer et al. |
| 8,401,744 B2 | 3/2013 | Chiocco |
| 8,427,288 B2 | 4/2013 | Schofield et al. |
| 8,469,125 B2 | 6/2013 | Yu et al. |
| 8,504,243 B2 | 8/2013 | Kageyama |
| 8,548,680 B2 | 10/2013 | Ryerson et al. |
| 8,548,683 B2 | 10/2013 | Cebon et al. |
| 8,576,115 B2 | 11/2013 | Basten |
| 8,626,382 B2 | 1/2014 | Obradovich |
| 8,675,953 B1 | 3/2014 | Elwell et al. |
| 8,755,984 B2 | 6/2014 | Rupp et al. |
| 8,807,261 B2 | 8/2014 | Subrt et al. |
| 8,825,328 B2 | 9/2014 | Rupp et al. |
| 8,833,789 B2 | 9/2014 | Anderson |
| 8,886,400 B2 | 11/2014 | Kossira et al. |
| 8,888,120 B2 | 11/2014 | Trevino |

(56) References Cited

U.S. PATENT DOCUMENTS

| | | |
|---|---|---|
| 8,909,426 B2 | 12/2014 | Rhode et al. |
| 8,930,140 B2 | 1/2015 | Trombley et al. |
| 8,939,462 B2 | 1/2015 | Adamczyk et al. |
| 8,955,865 B2 | 2/2015 | Fortin et al. |
| 8,972,109 B2 | 3/2015 | Lavoie et al. |
| 9,008,913 B1 | 4/2015 | Sears et al. |
| 9,026,311 B1 | 5/2015 | Pieronek et al. |
| 9,042,603 B2 | 5/2015 | Elwart et al. |
| 9,082,315 B2 | 7/2015 | Lin et al. |
| 9,108,598 B2 | 8/2015 | Headley |
| 9,114,832 B2 | 8/2015 | Wang et al. |
| 9,120,358 B2 | 9/2015 | Motts et al. |
| 9,120,359 B2 | 9/2015 | Chiu et al. |
| 9,156,496 B2 | 10/2015 | Greenwood et al. |
| 9,164,955 B2 | 10/2015 | Lavoie et al. |
| 9,180,890 B2 | 11/2015 | Lu et al. |
| 9,187,124 B2 | 11/2015 | Trombley et al. |
| 9,238,483 B2 | 1/2016 | Hafner et al. |
| 9,248,858 B2 | 2/2016 | Lavoie et al. |
| 9,315,212 B1 | 4/2016 | Kyrtsos et al. |
| 9,321,483 B2 | 4/2016 | Headley |
| 9,335,162 B2 | 5/2016 | Kyrtsos et al. |
| 9,340,228 B2 | 5/2016 | Xu et al. |
| 9,393,996 B2 | 7/2016 | Goswami et al. |
| 9,434,414 B2 | 9/2016 | Lavoie |
| 9,500,497 B2 | 11/2016 | Lavoie |
| 2001/0024333 A1 | 9/2001 | Rost |
| 2001/0037164 A1 | 11/2001 | Hecker |
| 2002/0128764 A1 | 9/2002 | Hecker et al. |
| 2004/0017285 A1 | 1/2004 | Zielinski et al. |
| 2004/0021291 A1 | 2/2004 | Haug et al. |
| 2004/0093139 A1 | 5/2004 | Wildey et al. |
| 2004/0130441 A1 | 7/2004 | Lee et al. |
| 2004/0222881 A1 | 11/2004 | Deng et al. |
| 2005/0000738 A1 | 1/2005 | Gehring et al. |
| 2005/0128059 A1 | 6/2005 | Vause |
| 2005/0206224 A1 | 9/2005 | Lu |
| 2005/0206225 A1 | 9/2005 | Offerle et al. |
| 2005/0206229 A1 | 9/2005 | Lu et al. |
| 2005/0206231 A1 | 9/2005 | Lu et al. |
| 2005/0236201 A1 | 10/2005 | Spannheimer et al. |
| 2005/0236896 A1 | 10/2005 | Offerle et al. |
| 2006/0041358 A1 | 2/2006 | Hara |
| 2006/0071447 A1 | 4/2006 | Gehring et al. |
| 2006/0076828 A1 | 4/2006 | Lu et al. |
| 2006/0103511 A1 | 5/2006 | Lee et al. |
| 2006/0111820 A1 | 5/2006 | Goetting et al. |
| 2006/0142936 A1 | 6/2006 | Dix |
| 2006/0155455 A1 | 7/2006 | Lucas et al. |
| 2006/0244579 A1 | 11/2006 | Raab |
| 2007/0027581 A1 | 2/2007 | Bauer et al. |
| 2007/0090688 A1 | 4/2007 | Haemmerling et al. |
| 2007/0132560 A1 | 6/2007 | Nystrom et al. |
| 2007/0152424 A1 | 7/2007 | Deng et al. |
| 2007/0285808 A1 | 12/2007 | Beale |
| 2008/0143593 A1 | 6/2008 | Graziano et al. |
| 2008/0147277 A1 | 6/2008 | Lu et al. |
| 2008/0231701 A1 | 9/2008 | Greenwood et al. |
| 2008/0312792 A1 | 12/2008 | Dechamp |
| 2009/0005932 A1 | 1/2009 | Lee et al. |
| 2009/0079828 A1 | 3/2009 | Lee et al. |
| 2009/0085775 A1 | 4/2009 | Otsuka et al. |
| 2009/0093928 A1 | 4/2009 | Getman et al. |
| 2009/0198425 A1 | 8/2009 | Englert |
| 2009/0228182 A1 | 9/2009 | Waldbauer et al. |
| 2009/0248346 A1 | 10/2009 | Fennel et al. |
| 2009/0300701 A1 | 12/2009 | Karaoguz et al. |
| 2009/0306861 A1 | 12/2009 | Schumann et al. |
| 2010/0063702 A1 | 3/2010 | Sabelstrom et al. |
| 2010/0171828 A1 | 7/2010 | Ishii |
| 2010/0332049 A1 | 12/2010 | Sy et al. |
| 2011/0001825 A1 | 1/2011 | Hahn |
| 2011/0018231 A1 | 1/2011 | Collenberg |
| 2011/0022282 A1 | 1/2011 | Wu et al. |
| 2011/0087398 A1 | 4/2011 | Lu et al. |
| 2011/0112721 A1 | 5/2011 | Wang et al. |
| 2011/0125457 A1 | 5/2011 | Lee et al. |
| 2011/0160956 A1 | 6/2011 | Chung et al. |
| 2011/0257860 A1 | 10/2011 | Getman et al. |
| 2012/0041658 A1 | 2/2012 | Turner |
| 2012/0086808 A1 | 4/2012 | Lynam et al. |
| 2012/0095649 A1 | 4/2012 | Klier et al. |
| 2012/0109471 A1 | 5/2012 | Wu |
| 2012/0112434 A1 | 5/2012 | Albers et al. |
| 2012/0185131 A1 | 7/2012 | Headley |
| 2012/0200706 A1 | 8/2012 | Greenwood et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0271522 A1 | 10/2012 | Rupp et al. |
| 2012/0283909 A1 | 11/2012 | Dix |
| 2012/0283910 A1 | 11/2012 | Lee et al. |
| 2012/0310594 A1 | 12/2012 | Watanabe |
| 2013/0006472 A1 | 1/2013 | McClain et al. |
| 2013/0024064 A1 | 1/2013 | Shepard |
| 2013/0027195 A1 | 1/2013 | Van Wiemeersch et al. |
| 2013/0082453 A1 | 4/2013 | Padula |
| 2013/0158863 A1 | 6/2013 | Skvarce et al. |
| 2013/0179038 A1 | 7/2013 | Goswami et al. |
| 2013/0207834 A1 | 8/2013 | Mizutani et al. |
| 2013/0226390 A1 | 8/2013 | Luo et al. |
| 2013/0250114 A1 | 9/2013 | Lu |
| 2013/0261843 A1 | 10/2013 | Kossira et al. |
| 2013/0268160 A1 | 10/2013 | Trombley et al. |
| 2014/0005918 A1 | 1/2014 | Qiang |
| 2014/0025260 A1 | 1/2014 | McClure |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0067154 A1 | 3/2014 | Yu et al. |
| 2014/0067155 A1 | 3/2014 | Yu et al. |
| 2014/0085472 A1 | 3/2014 | Lu et al. |
| 2014/0088824 A1 | 3/2014 | Ishimoto |
| 2014/0160276 A1 | 6/2014 | Pliefke et al. |
| 2014/0172232 A1 | 6/2014 | Rupp et al. |
| 2014/0183841 A1 | 7/2014 | Jones |
| 2014/0188344 A1 | 7/2014 | Lavoie |
| 2014/0188346 A1 | 7/2014 | Lavoie |
| 2014/0210456 A1 | 7/2014 | Crossman |
| 2014/0218506 A1 | 8/2014 | Trombley et al. |
| 2014/0218522 A1 | 8/2014 | Lavoie et al. |
| 2014/0222288 A1 | 8/2014 | Lavoie et al. |
| 2014/0236532 A1 | 8/2014 | Trombley et al. |
| 2014/0249691 A1 | 9/2014 | Hafner et al. |
| 2014/0267688 A1 | 9/2014 | Aich et al. |
| 2014/0267689 A1 | 9/2014 | Lavoie |
| 2014/0277941 A1 | 9/2014 | Chiu et al. |
| 2014/0277942 A1 | 9/2014 | Kyrtsos et al. |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0309888 A1 | 10/2014 | Smit et al. |
| 2014/0324295 A1 | 10/2014 | Lavoie |
| 2014/0343795 A1 | 11/2014 | Lavoie |
| 2014/0358429 A1 | 12/2014 | Shutko et al. |
| 2014/0379217 A1 | 12/2014 | Rupp et al. |
| 2015/0002670 A1 | 1/2015 | Bajpai |
| 2015/0035256 A1 | 2/2015 | Klank et al. |
| 2015/0057903 A1 | 2/2015 | Rhode et al. |
| 2015/0066296 A1 | 3/2015 | Trombley et al. |
| 2015/0066298 A1 | 3/2015 | Sharma et al. |
| 2015/0105975 A1 | 4/2015 | Dunn |
| 2015/0115571 A1 | 4/2015 | Zhang et al. |
| 2015/0120141 A1 | 4/2015 | Lavoie et al. |
| 2015/0120143 A1 | 4/2015 | Schlichting |
| 2015/0134183 A1 | 5/2015 | Lavoie et al. |
| 2015/0138340 A1 | 5/2015 | Lavoie |
| 2015/0149040 A1 | 5/2015 | Hueger et al. |
| 2015/0158527 A1 | 6/2015 | Hafner et al. |
| 2015/0165850 A1 | 6/2015 | Chiu et al. |
| 2015/0197278 A1 | 7/2015 | Boos et al. |
| 2015/0203156 A1 | 7/2015 | Hafner et al. |

(56) References Cited

U.S. PATENT DOCUMENTS

| | | |
|---|---|---|
| 2015/0210254 A1 | 7/2015 | Pieronek et al. |
| 2015/0210317 A1 | 7/2015 | Hafner et al. |
| 2015/0217693 A1 | 8/2015 | Pliefke et al. |
| 2015/0269444 A1 | 9/2015 | Lameyre et al. |
| 2016/0009288 A1 | 1/2016 | Yu |
| 2016/0039456 A1 | 2/2016 | Lavoie et al. |
| 2016/0059888 A1 | 3/2016 | Bradley et al. |
| 2016/0059889 A1 | 3/2016 | Herzog et al. |
| 2016/0096549 A1 | 4/2016 | Herzog et al. |
| 2016/0129939 A1 | 5/2016 | Singh et al. |
| 2016/0152263 A1 | 6/2016 | Singh et al. |
| 2016/0153778 A1 | 6/2016 | Singh et al. |
| 2016/0229452 A1 | 8/2016 | Lavoie et al. |
| 2016/0280267 A1 | 9/2016 | Lavoie et al. |

FOREIGN PATENT DOCUMENTS

| | | |
|---|---|---|
| DE | 3931518 A1 | 4/1991 |
| DE | 9208595 U1 | 8/1992 |
| DE | 19526702 A1 | 2/1997 |
| DE | 10030738 C1 | 8/2001 |
| DE | 10031244 A1 | 1/2002 |
| DE | 10065230 A1 | 7/2002 |
| DE | 10122562 C1 | 7/2002 |
| DE | 10154612 A1 | 5/2003 |
| DE | 10312548 B3 | 5/2004 |
| DE | 10333998 A1 | 2/2005 |
| DE | 102004050149 A1 | 4/2006 |
| DE | 102005042957 A1 | 3/2007 |
| DE | 102005043466 A1 | 3/2007 |
| DE | 102005043467 A1 | 3/2007 |
| DE | 102005043468 A1 | 3/2007 |
| DE | 102006002294 A1 | 7/2007 |
| DE | 102006048947 A1 | 4/2008 |
| DE | 102006056408 A1 | 6/2008 |
| DE | 102008020838 A1 | 11/2008 |
| DE | 102007029413 A1 | 1/2009 |
| DE | 102008045436 A1 | 3/2010 |
| DE | 102006035021 B4 | 4/2010 |
| DE | 102008043675 A1 | 5/2010 |
| DE | 102009007990 A1 | 8/2010 |
| DE | 102009012253 A1 | 9/2010 |
| DE | 102009027041 A1 | 12/2010 |
| DE | 102009038552 A1 | 2/2011 |
| DE | 102010006323 A1 | 8/2011 |
| DE | 102008004158 B4 | 10/2011 |
| DE | 102008004159 B4 | 10/2011 |
| DE | 102008004160 B4 | 10/2011 |
| DE | 102010021052 A1 | 11/2011 |
| DE | 102010029184 A1 | 11/2011 |
| DE | 102010045519 A1 | 3/2012 |
| DE | 102011104256 A1 | 7/2012 |
| DE | 102011101990 B3 | 10/2012 |
| DE | 202012010517 U | 12/2012 |
| DE | 102011108440 A1 | 1/2013 |
| DE | 102011120814 A1 | 6/2013 |
| DE | 102012006206 A1 | 10/2013 |
| DE | 102012206133 A1 | 10/2013 |
| DE | 102012019234 A1 | 4/2014 |
| DE | 102013000198 A1 | 7/2014 |
| EP | 0418653 A1 | 3/1991 |
| EP | 0433858 A2 | 6/1991 |
| EP | 1361543 A2 | 11/2003 |
| EP | 1593552 B1 | 3/2007 |
| EP | 1810913 A1 | 7/2007 |
| EP | 2388180 A2 | 11/2011 |
| EP | 2452549 A1 | 5/2012 |
| EP | 2487454 A2 | 8/2012 |
| EP | 2551132 A1 | 1/2013 |
| EP | 2644477 A1 | 10/2013 |
| EP | 2803944 A2 | 11/2014 |
| FR | 2515379 A1 | 4/1983 |
| GB | 2265587 A | 10/1993 |
| GB | 2342630 A | 4/2000 |
| GB | 2398048 A | 8/2004 |
| GB | 2398049 A | 8/2004 |
| GB | 2398050 A | 8/2004 |
| JP | 61006458 | 1/1986 |
| JP | 6159491 A | 3/1986 |
| JP | 6385568 U | 6/1988 |
| JP | 01095980 A | 4/1989 |
| JP | 01095981 A | 4/1989 |
| JP | 09267762 A | 10/1997 |
| JP | 09328078 A | 12/1997 |
| JP | 10001063 A | 1/1998 |
| JP | 11124051 A | 5/1999 |
| JP | 11278319 A | 10/1999 |
| JP | 2002012172 A | 1/2002 |
| JP | 2002068032 A | 3/2002 |
| JP | 2003034261 A | 2/2003 |
| JP | 2003148938 A | 5/2003 |
| JP | 3716722 B2 | 11/2005 |
| JP | 2008027138 A1 | 2/2008 |
| JP | 2012105158 A | 5/2012 |
| JP | 2012166647 A | 9/2012 |
| JP | 2014002056 A | 1/2014 |
| WO | 8503263 A1 | 8/1985 |
| WO | 0044605 A1 | 8/2000 |
| WO | 2005005200 A2 | 1/2005 |
| WO | 2005116688 A2 | 12/2005 |
| WO | 2006042665 A1 | 4/2006 |
| WO | 2012059207 A1 | 5/2012 |
| WO | 2012103193 A1 | 8/2012 |
| WO | 2014019730 A1 | 2/2014 |
| WO | 2014037500 A1 | 3/2014 |
| WO | 2014070047 A1 | 5/2014 |
| WO | 2014092611 A1 | 6/2014 |
| WO | 2014123575 A1 | 8/2014 |
| WO | 2015074027 A1 | 5/2015 |

OTHER PUBLICATIONS

Kristopher Bunker, "2012 Guide to Towing", Trailer Life, 2012, 38 pages.
A. Gonzalez-Cantos, "Backing-Up Maneuvers of Autonomous Tractor-Trailer Vehicles using the Qualitative Theory of Nonlinear Dynamical Systems," International Journal of Robotics Research, Jan. 2009, vol. 28, 1 page.
L. Chu, Y. Fang, M. Shang, J. Guo, F. Zhou, "Estimation of Articulation Angle for Tractor Semi-Trailer Based on State Observer", ACM Digital Library, ICMTMA '10 Proceedings of the 2010 International Conference on Measuring Technology and Automation, vol. 2, Mar. 2010, 1 page.
M. Wagner, D. Zoebel, and A. Meroth, "Adaptive Software and Systems Architecture for Driver Assistance Systems" International Journal of Machine Learning and Computing, Oct. 2011, vol. 1, No. 4, 7 pages.
F.W. Kienhöfer; D. Cebon, "An Investigation of ABS Strategies for Articulated Vehicles", Cambridge University, Engineering Department, United Kingdom, date unknown, 13 pages.
C. Lundquist; W. Reinelt; O. Enqvist, "Back Driving Assistant for Passenger Cars with Trailer", ZF Lenksysteme GmbH, Schwäbisch Gmünd, Germany, 2006 (SAE Int'l) Jan. 2006, 8 pages.
Zhe Leng; Minor, M., "A Simple Tractor-Trailer Backing Control Law for Path Following", IEEE, Intelligent Robots and Systems (IROS) IEEE/RSJ International Conference, Oct. 2010, 2 pages.
Kinjo, H.; Maeshiro, M.; Uezato, E.; Yamamoto, T., "Adaptive Genetic Algorithm Observer and its Application to Trailer Truck Control System", IEEE, SICE-ICASE International Joint Conference, Oct. 2006, 2 pgs.
J. Roh; H. Lee; W. Chung, "Control of a Car with a Trailer Using the Driver Assistance System", IEEE, International Conference on Robotics and Biomimetics; Phuket, Thailand, Dec. 2011, 6 pages.
A. Gonzalez-Cantos; J.I. Maza; A. Ollero, "Design of a Stable Backing Up Fuzzy Control of Autonomous Articulated Vehicles for Factory Automation", Dept. of Systems Engineering and Automatic Control, University of Seville, Spain, 2001, 5 pages.
Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pages.

(56) References Cited

OTHER PUBLICATIONS

Zare, A. Sharafi; M. Kamyad, A.V., "A New Approach in Intelligent Trailer Parking", IEEE, 2010 2nd International Mechanical and Electrical Technology (ICMET), Sep. 2010, 1 page.
Tanaka, K.; Sano, M., "A Robust Stabilization Problem of Fuzzy Control Systems and its Application to Backing up Control of a Truck-trailer", IEEE Transactions on Fuzzy Systems, May 1994, vol. 2, No. 2, 1 page.
Sharafi, M. Zare; A. Kamyad; A.V. Nikpoor, S., "Intelligent Parking Method for Truck in Presence of Fixed and Moving Obstacles and Trailer in Presence of Fixed Obstacles: Advanced Fuzzy Logic Technologies in Industrial Applications", IEEE, 2010 International Electronics and Information Engineering (ICEIE), Aug. 2010, vol. 2, 1 page.
Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 2007, 1 page.
Sharafi, M. Zare; A. Kamyad; A.V. Nikpoor, S., "Intelligent Parking Method for Trailers in Presence of Fixed and Moving Obstacles", IEEE, 2010 3rd International Conference on Advanced Computer Theory and Engineering (ICACTE), Aug. 2010, vol. 6, 1 page.
Chieh Chen; Tomizuka, M., "Steering and Independent Braking Control for Tractor-Semitrailer Vehicles in Automated Highway Systems", IEEE, Proceedings of the 34th IEEE Conference on Decision and Control, Dec. 1995, vol. 2, 1 page.
P. Bolzern, R.M. Desantis, A. Locatelli, "An Input-Output Linearization Approach to the Control of an n-Body Articulated Vehicle", J. Dyn. Sys., Meas., Control, Sep. 2001, vol. 123, No. 3, 3 pages.
Dieter Zöbel, David Polock, Philipp Wojke, "Steering Assistance for Backing Up Articulated Vehicles", Systemics, Cybernetics and Informatics; vol. 1, No. 5, date unknown, 6 pages.
J.R. Billing; J.D. Patten; R.B. Madill, "Development of Configurations for Infrastructure-Friendly Five- and Six-Axle SemiTrailers", National Research Council of Canada and Ontario Ministry of Transportation, date unknown, 11 pages.
Jesus Morales, Anthony Mandow, Jorge L. Martinez, and Alfonso Garcia-Cerezo, "Driver Assistance System for Backward Maneuvers in Passive Multi-Trailer Vehicles", IEEE/RSJ International Conference on Intelligent Robots and Systems (IROS), Oct. 2012, 7 pages.
Cedric Pradalier and Kane Usher, "Experiments in Autonomous Reversing of a Tractor-Trailer System", 6th International Conference on Field and Service Robotics, inria-00195700, Version 1, Dec. 2007, 10 pages.
Andri Riid, Alar Leibak, Ennu Rüstern, "Fuzzy Backing Control of Truck and Two Trailers", Tallinn University of Technology; Tallinn, Estonia, date unknown, 6 pages.
Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, 14 pages.

Jujnovich, B.; Roebuck, R.; Odhams, A.; David, C., "Implementation of Active Rear Steering of a Tractor Semitrailer", Cambridge University, Engineering Department; Cambridge, United Kingdom, date unknown, 10 pages.
A.M.C. Odhams; R.L. Roebuck; C. Cebon, "Implementation of Active Steering on a Multiple Trailer Long Combination Vehicle", Cambridge University, Engineering Department; Cambridge, United Kingdom, date unknown, 13 pages.
Cedric Pradalier and Kane Usher, "Robust Trajectory Tracking for a Reversing Tractor-Trailer System", (Draft), Field and Service Robotics Conference, CSIRO ICT Centre, Jul. 2007, 16 pages.
Stahn, R.; Heiserich, G.; Stopp, A., "Laser Scanner-Based Navigation for Commercial Vehicles", IEEE, 2007 IEEE Intelligent Vehicles Symposium, Jun. 2007, 1 page.
Lee Yong H.; Weiwen Deng; Chin Yuen-Kwok Steve; Mckay Neil, "Feasibility Study for a Vehicle-Trailer Backing Up Control", Refdoc.fr, SAE Transactions, vol. 113, No. 6, 2004, 1 page.
A.M.C. Odhams; R.L. Roebuck; B.A. Jujnovich; D. Cebon, "Active Steering of a Tractor- Semi-Trailer" Proceedings of the Institution of Mechanical Engineers, Part D: Journal of Automobile Engineering, SAGE Journals, vol. 225, No. 7, Jul. 2011, 1 page.
Haviland, G S, "Automatic Brake Control for Trucks—What Good Is It?", TRID, Society of Automotive Engineers, Sep. 1968, 1 page.
William E. Travis; David W. Hodo; David M. Bevly; John Y. Hung, "UGV Trailer Position Estimation Using a Dynamic Base RTK System", American Institute of Aeronautics and Astronautics, date unknown, 12 pages.
"VSE Electronic Trailer Steering", ETS for Trailers, version 2009, VSE Trailer Systems B.V., 2009, 28 pages.
"Telematics Past, Present, and Future," Automotive Service Association, www.ASAshop.org, May 2008, 20 pages.
"Fully Automatic Trailer Tow Hitch With LIN Bus," https://webista.bmw.com/webista/show?id=18605754998&lang=engb&print=1, date unknown, 5 pages.
"VBOX Yaw Rate Sensor With Integral Accelerometers," Racelogic, www.racelogic.co.uk, date unknown, 2 pages.
P.D.C.R Jayarathna; J.V Wijayakulasooriya; S.R Kodituwakku, "Fuzzy Logic and Neural Network Control Systems for Backing up a Truck and a Trailer", International Journal of Latest Trends in Computing, vol. 2, No. 3, Sep. 2011, 8 pages.
Olof Enqvist, "AFS-Assisted Trailer Reversing," Institutionen för systemteknik Deartment of Electrical Engineering, Jan. 27, 2006, 57 pages.
Novak, Domen; Dovzan, Dejan; Grebensek, Rok; Oblak, Simon, "Automated Parking System for a Truck and Trailer", International Conference on Advances in the Internet, Processing, Systems and Interdisciplinary Research, Florence, 2007, WorldCat.org, 13 pgs.
Sh. Azadi, H.R. Rezaei Nedamani, and R. Kazemi, "Automatic Parking of an Articulated Vehicle Using ANFIS", Global Journal of Science, Engineering and Technology (ISSN: 2322-2441), 2013, pp. 93-104, Issue No. 14.
F. Cuesta and A. Ollero, "Intelligent System for Parallel Parking of Cars and Tractor-Trailers", Intelligent Mobile Robot Navigation, STAR, 2005, pp. 159-188, Springer-Verlag Berlin Heidelberg.

SYSTEM AND METHOD FOR HITCH ANGLE DETECTION

FIELD OF THE INVENTION

The present invention generally relates to trailer backup assist systems, and more particularly, to trailer backup assist systems having hitch angle detection functionality.

BACKGROUND OF THE INVENTION

Trailer backup assist systems are generally used to assist a vehicle operator in backing a trailer. Such systems often rely on hitch angle detection to successfully execute backing maneuvers.

SUMMARY OF THE INVENTION

According to one aspect of the present invention, a hitch angle detection system is provided. Ultrasonic transducers are disposed on a rear vehicle structure and are configured to transmit ultrasonic waves in a rearward vehicle direction. An ultrasonic reflector is disposed on a trailer and is configured to reflect incident ultrasonic waves back toward the corresponding ultrasonic transducers. A processor is configured to derive distance measurements between the ultrasonic transducers and the ultrasonic reflector and determine a hitch angle based on the derived distance measurements.

According to another aspect of the present invention, a hitch angle detection system is provided. Ultrasonic transducers are disposed on a rear vehicle structure and are configured to transmit ultrasonic waves in a rearward vehicle direction. An ultrasonic resonator is disposed on a trailer and is configured to reflect incident ultrasonic waves back toward the ultrasonic transducers. A processor is configured to derive distance measurements between the ultrasonic reflector and at least two of the ultrasonic transducers and determine a hitch angle based on the derived distance measurements.

According to yet another aspect of the present invention, a hitch angle detection method is provided. The method includes the steps of: transmitting ultrasonic waves in a rearward vehicle direction with ultrasonic transducers disposed on a rear vehicle structure; providing an ultrasonic reflector on a trailer and reflecting incident ultrasonic waves back toward the corresponding ultrasonic transducers; using a processor to derive distance measurements between the ultrasonic transducers and the ultrasonic reflector; and determining a hitch angle based on the derived distance measurements.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein.

However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
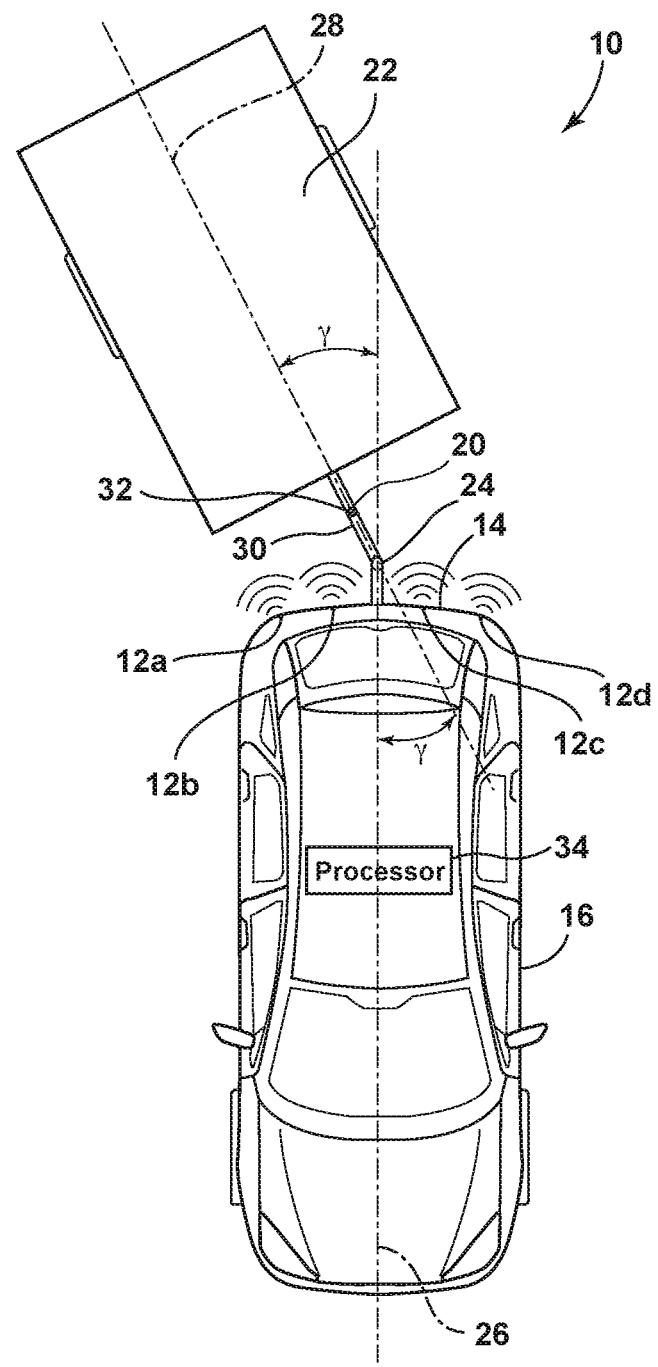
FIG. 1 illustrates a schematic diagram of a hitch angle detection system according to one embodiment.

Referring to FIG. 1, a schematic diagram of a hitch angle detection system 10 is shown according to one embodiment. The system 10 includes a plurality of ultrasonic transducers, shown as ultrasonic transducers 12a-12d, disposed on a rear vehicle structure 14 such as a rear bumper of a vehicle 16. The ultrasonic transducers 12a-12d may be active or passive transducers and are configured to transmit ultrasonic waves in a rearward vehicle direction. An ultrasonic reflector 20 is disposed on a trailer 22 that is pivotally attached to the vehicle 16 at hitch connection point 24 (e.g., a hitch ball), which is intersected by a longitudinal axis 26 of the vehicle 16 and a longitudinal axis 28 of the trailer 22. The ultrasonic reflector 20 may be disposed on a trailer tongue 30 and is configured to reflect incident ultrasonic waves back toward the corresponding ultrasonic transducer 12a-12d from which the ultrasonic waves originated. The ultrasonic reflector 20 may include a Helmholtz cavity 32 for amplifying the ultrasonic waves reflected back to the ultrasonic transducers 12a-12d. The ultrasonic transducers 12a-12d are each configured to detect reflected ultrasonic waves and are communicatively coupled to one or more processors 34 configured to derive distance measurements between the ultrasonic transducers 12a-12d and the ultrasonic reflector 20 and determine a hitch angle y based on the derived distance measurements. With respect to the embodiments described herein, the hitch angle y corresponds to the angle between the longitudinal axis 26 of the vehicle 16 and a longitudinal axis 28 of the trailer 22 at the hitch connection point 24.

Figure 2:
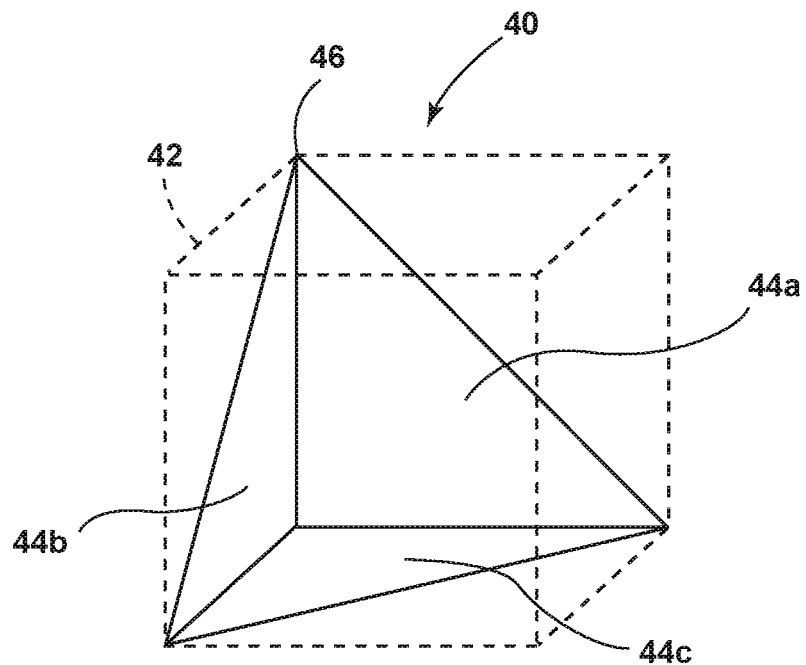
FIG. 2 illustrates an ultrasonic reflector according to one embodiment.
Figure 3:
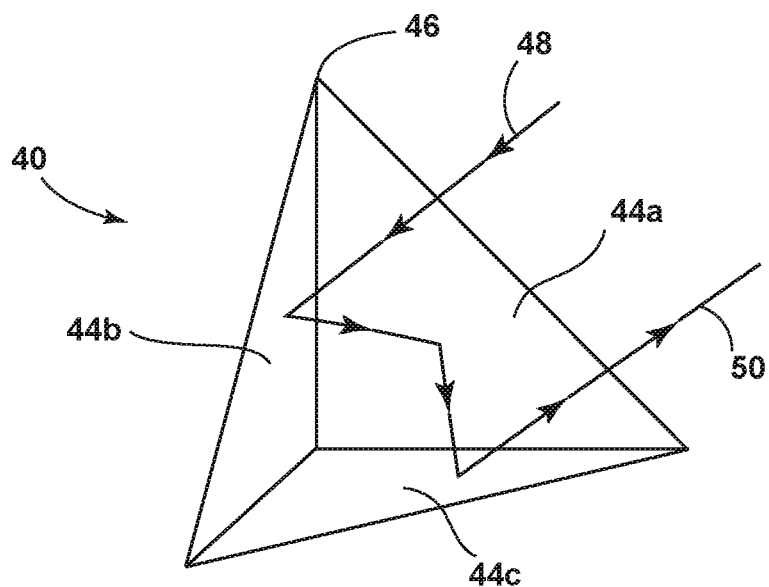
FIG. 3 illustrates an ultrasonic wave striking the ultrasonic reflector of FIG. 2, according to one embodiment.

Referring to FIGS. 2 and 3, the ultrasonic reflector 20 may be configured as a trihedral rectangular reflector 40. As illustrated in FIG. 2, the trihedral rectangular reflector 40 corresponds to an intersection of a cube 42 and has interior planes 44a-44c and a top 46. In operation, the interior planes 44a-44c of the trihedral rectangular reflector 40 reflect ultrasonic waves received from ultrasonic transducers 12a-12d. As illustrated in FIG. 3, an incoming ultrasonic wave, shown as ray 48, undergoes a triple reflection on the interior planes 44a-44c prior to leaving the ultrasonic reflector 20. The outgoing ultrasonic wave, shown as ray 50, is parallel to and propagates in the opposite direction of ray 48. Thus, by measuring the time interval between transmitting the ultrasonic wave and receiving the reflected ultrasonic wave, the distance between a given ultrasonic transducer 12a-12d and the ultrasonic reflector 20 can be determined. With respect to trihedral rectangular reflector 40, the distance generally corresponds to the distance between the given ultrasonic transducer $12a$-$12d$ and the top 46 of the trihedral rectangular reflector 40.

Figure 4:
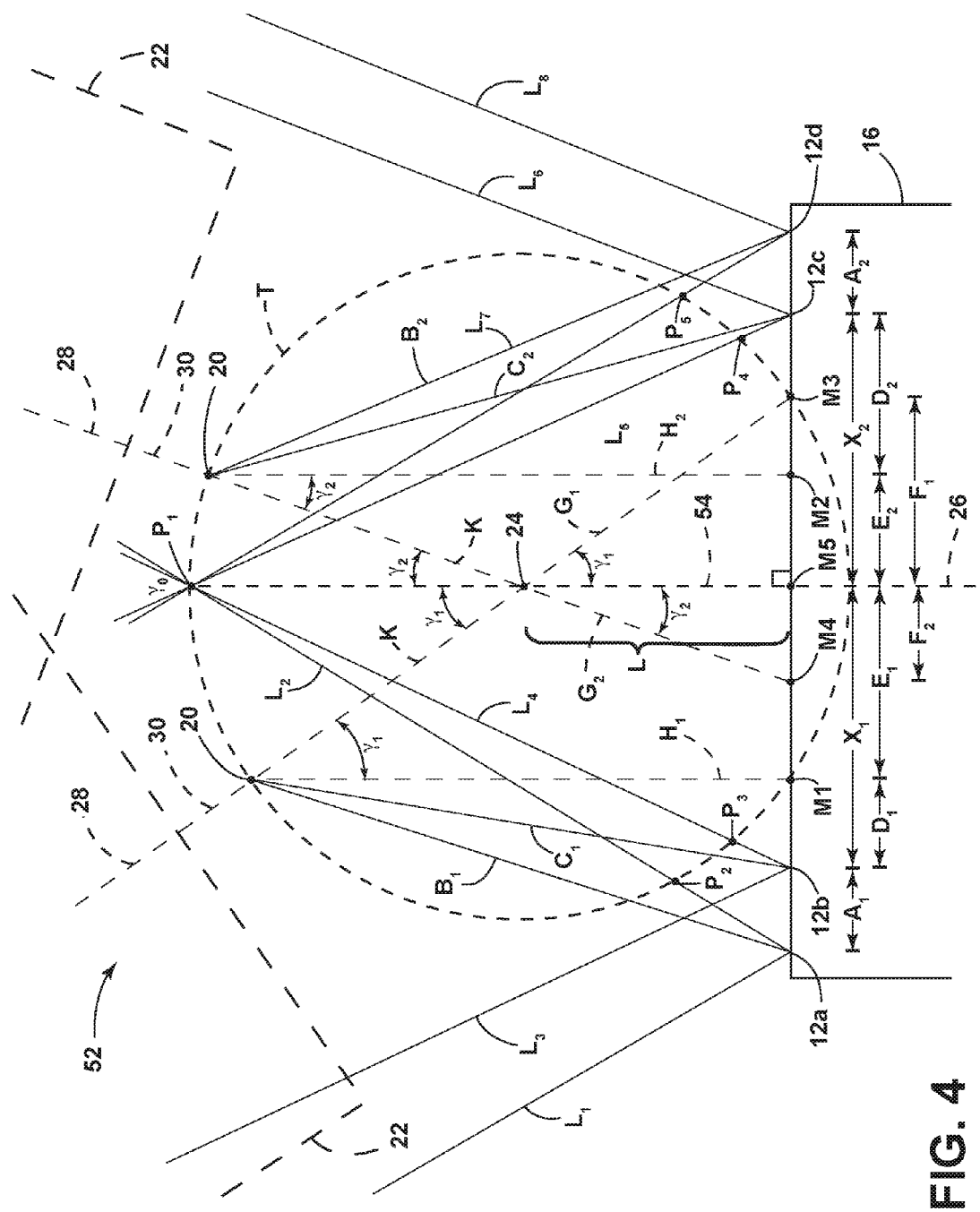
FIG. 4 illustrates a kinematic model in which a trailer is positioned at a negative hitch angle and a positive hitch angle relative to a vehicle.

Referring to FIG. 4, a kinematic model 52 of the vehicle 16 and trailer 22 is illustrated in which the trailer 22 is exemplarily positioned relative to the vehicle 16 at a negative hitch angle $\gamma_1$ and a positive hitch angle $\gamma_2$, respectively. It should be appreciated that the terms "negative" and "positive" to describe the hitch angle between the vehicle 16 and the trailer 22 are used herein to describe the angular position of the longitudinal axis 28 of the trailer 22 relative to the longitudinal axis 26 of the vehicle 16. As shown, the longitudinal axis 26 of the vehicle 16 coincides with a vehicle hitch bar 54 of known length L and intersects the hitch connection point 24 at which the trailer tongue 30 is pivotally coupled to the vehicle hitch bar 54. The ultrasonic reflector 20 is disposed on the trailer tongue 30 at a known distance K from the hitch connection point 24 and is displaceable along trajectory T depending on the hitch angle between the vehicle 16 and the trailer 22.

Ultrasonic transducers $12a$-$12d$ are spaced along the rear vehicle structure 14, which is perpendicular to the longitudinal axis 26 of the vehicle 16. In the illustrated embodiment, ultrasonic transducers $12b$ and $12c$ are disposed on opposite sides of longitudinal axis 26 at known distances $X_1$ and $X_2$, each of which have corresponding distance components $D_1$, $D_2$ and $E_1$, $E_2$. Distance component $E_1$ and $E_2$ each correspond to a horizontal distance between the longitudinal axis 26 of the vehicle 16 and a corresponding point $M_1$, $M_2$ on the rear vehicle structure 14 that meets with a dotted line $H_1$, $H_2$ corresponding to the shortest distance between the ultrasonic reflector 20 and the rear vehicle structure 14 with respect to the two positions of the ultrasonic reflector 20 as shown in FIG. 4. Distance component $D_1$ corresponds to the distance between point $M_1$ and ultrasonic transducer $12b$ and distance component $D_2$ corresponds to the distance between point $M_2$ and ultrasonic transducer $12c$. Ultrasonic transducers $12a$ and $12d$ are located outermost from the longitudinal axis 26 of the vehicle 16 and are each disposed on opposite sides of the longitudinal axis 26 at corresponding distances A1 and A2 from ultrasonic transducers $12b$ and $12c$, respectively.

In the illustrated embodiment, each ultrasonic transducer $12a$-$12d$ has a corresponding transmission envelope with boundary lines $L_1$ and $L_2$, $L_3$ and $L_4$, $L_5$ and $L_6$, and $L_7$ and $L_8$, respectively. In operation, ultrasonic waves transmitted from a given ultrasonic transducer $12a$-$12d$ are able to strike the ultrasonic reflector 20 and be reflected therefrom back toward the ultrasonic transducer $12a$-$12d$ when the ultrasonic reflector 20 is positioned at a point along trajectory T that is covered by the corresponding transmission envelope of the ultrasonic transducer $12a$-$12d$. This includes points $P_1$, $P_2$, and all points therebetween for ultrasonic transducer $12a$; points $P_1$, $P_3$, and all points therebetween for ultrasonic transducer $12b$; points $P_1$, $P_4$, and all points therebetween for ultrasonic transducer $12c$; and points $P_1$, $P_5$, and all points therebetween for ultrasonic transducer $12d$. In turn, processor 34 can derive distance measurements between a given ultrasonic transducer $12a$-$12d$ and the ultrasonic reflector 20 so long as ultrasonic waves transmitted from the given ultrasonic transducer $12a$-$12d$ are able to strike and be reflected from the ultrasonic reflector 20.

As will be described below in greater detail, the processor 34 can determine negative hitch angle values based on derived distance measurements between the ultrasonic reflector 20 and each of ultrasonic transducers $12a$ and $12b$. Conversely, the processor 34 can determine positive hitch angle values based on derived distance measurements between the ultrasonic reflector 20 and each of ultrasonic transducers $12c$ and $12d$.

Referring still to FIG. 4, the negative hitch $\gamma_1$ can be determined by solving the following equation:

$$\cos(\gamma_1) = \frac{H_1}{G_1}, \quad (1)$$

where $G_1$ is a line intersecting the hitch connection point 24 and spanning from the ultrasonic reflector 20 to point $M_3$ on the rear vehicle structure 14, Using Pythagorean's Theorem, $H_1$ and $G_1$ can be solved as:

$$H_1 = \sqrt{C_1^2 - D_1^2}$$

and $$G_1 = \sqrt{H_1^2 + (E_1 + F_1)^2},$$

where $F_1$ is a horizontal distance between point $M_5$ (where longitudinal axis 26 meets with the rear vehicle structure 14) and point $M_3$.

Substituting for $H_1$ and $G_1$, equation 1 can be rewritten as:

$$\cos(\gamma_1) = \sqrt{\frac{C_1^2 - D_1^2}{C_1^2 - D_1^2 + (E_1 + F_1)^2}}. \quad (2)$$

By recognizing that $C_1^2 - D_1^2 = B_1^2 - (A_1 + D_1)^2$, $D_1$ can be solved as:

$$D_1 = \frac{B_1^2 - A_1^2 - C_1^2}{2A_1}.$$

$F_1$ can be solved as:

$$F_1 = L \cdot \tan(\gamma_1).$$

Substituting for $D_1$ and $F_1$, equation 2 can be rewritten as:

$$\cos(\gamma_1) = \sqrt{\frac{C_1^2 - \frac{(B_1^2 - A_1^2 - C_1^2)^2}{4A_1^2}}{C_1^2 - \frac{(B_1^2 - A_1^2 - C_1^2)^2}{4A_1^2} + (E_1 + L * \tan(\gamma_1))^2}}. \quad (3)$$

Squaring both sides of Equation 3 and multiplying $4A_1^2$ across the numerator and denominator allows Equation 3 to be rewritten as:

$$\cos^2(\gamma_1) = \sqrt{\frac{4A_1^2 C_1^2 - (B_1^2 - A_1^2 - C_1^2)^2}{4A_1^2 C_1^2 - (B_1^2 - A_1^2 - C_1^2)^2 + 4A_1^2(E_1 + L * \tan(\gamma_1))^2}}. \quad (4)$$

Setting Q equal to $4A_1^2 C_1^2 - (B_1^2 - A_1^2 - C_1^2)^2$ allows equation 4 to be rewritten as:

$$\cos^2(\gamma_1) = \frac{Q}{Q + 4A_1^2(E_1 + L \cdot \tan(\gamma_1))^2},$$

which can be further rewritten as:

$$Q = Q \cdot \cos^2(\gamma_1) + 4A_1^2(E_1 \cdot \cos(\gamma_1) + L \cdot \sin(\gamma_1))^2. \quad (5)$$

Taking the square root of both sides and rearranging equation 5 yields the following set of equations:

$$2A_1E_1 \cdot \cos(\gamma_1) + 2A_1L \cdot \sin(\gamma_1) = \sqrt{Q} \cdot \sin(\gamma_1) \quad (6)$$

and $$2A_1E_1 \cdot \cos(\gamma_1) + 2A_1L \cdot \sin(\gamma_1) = -\sqrt{Q} \cdot \sin(\gamma_1). \quad (7)$$

Equations 6 and 7 are simplified into:

$$\tan(\gamma_1) = \frac{2A_1E_1}{\sqrt{Q} - 2A_1L} \quad (8)$$

and $$\tan(\gamma_1) = \frac{-2A_1E_1}{\sqrt{Q} + 2A_1L}. \quad (9)$$

Solving for $\gamma_1$ in equations 8 and 9 yields the following set of equations:

$$\gamma_1 = \arctan\left(\frac{2A_1E_1}{\sqrt{Q} - 2A_1L}\right) \quad (10)$$

and $$\gamma_1 = \arctan\left(\frac{-2A_1E_1}{\sqrt{Q} + 2A_1L}\right), \quad (11)$$

where $$E_1 = X_1 - \left(\frac{B_1^2 - A_1^2 - C_1^2}{2A_1}\right).$$

Equations 10 and 11 can be solved concurrently and each computed value for $\gamma_1$ can be used in the following equation to solve for K:

$$K = \frac{E_1}{\sin(\gamma_1)}. \quad (12)$$

Whichever $\gamma_1$ value yields a non-negative value for K is chosen as the actual value for negative hitch angle $\gamma_1$. Equations 10-12 can also be used to compute the positive hitch angle $\gamma_2$ by substituting $\gamma_2$, $A_2$, $B_2$, $C_2$, $E_2$, and $X_2$ for $\gamma_1$, $A_1$, $B_1$, $C_1$, $E_1$, and $X_1$ respectively. Since ultrasonic transducers 12a-12d are only able to strike the ultrasonic reflector 20 in concert when the ultrasonic reflector 20 is located at point $P_1$, the processor 34 can determine a zero hitch angle $\gamma_0$ without performing any calculations if reflected ultrasonic waves are received at each ultrasonic reflector 20. Alternatively, the processor 34 may compute a zero hitch angle $\gamma_0$ via equations 10-12 using variables $\gamma_0$, $A_1$, $B_1$, $C_1$, $E_1$, and $X_1$, variables $\gamma_0$, $A_2$, $B_2$, $C_2$, $E_2$, and $X_2$, or both.

From the equations provided above, it can be seen that in the case of a negative hitch angle, distance measurements between the ultrasonic reflector 20 and each of ultrasonic transducers 12a and 12b are required for the processor 34 to determine a negative hitch angle value. Likewise, in the case of a positive hitch angle, distance measurements between the ultrasonic reflector 20 and each of ultrasonic transducers 12c and 12d are required to determine a positive hitch angle value. Thus, with respect to the kinematic model 52 shown in FIG. 4, it is to be understood that the equations provided above are only valid for determining a range of hitch angles indicative of when the ultrasonic reflector 20 is positioned on trajectory T at points P2, P3, and all points there between, including P1. According to one embodiment, the range of hitch angles is from negative 60 degrees to positive 60 degrees. However, it should be appreciated that the determinable range of hitch angles may be increased or decreased, if so desired, by modifying the position of the ultrasonic transducers 12a-12d, the transmission envelopes of the ultrasonic transducers 12a-12d, and/or the location of the ultrasonic reflector 20, for example.

While solving equations 10 and 11, it is assumed that variable L, the length of the vehicle hitch bar 54, is known. Typically, L is determined and supplied to the system 10 by the vehicle OEM. Alternatively, a vehicle operator may measure variable L and input the measurement to the system 10 via a human machine interface such as a touchscreen display located in the vehicle cabin. Nevertheless, when L is unknown, the processor 34 may solve for L at a current position of the trailer 22 relative to the vehicle 16 by assuming an L value and performing a first iteration of equations 10 and 11 to determine a pseudo hitch angle, which is then used in equation 12 to solve for variable K. When the position of the trailer 22 changes, the processor 34 can perform another iteration of equations 10 and 11, using the same L value assumed in the first iteration, to determine another K value. The processor 34 may then take the difference between the K value found in the first iteration and the second iteration. If the K values are the same, then the actual length of the vehicle hitch bar 54 has been determined. In practice, the absolute value of the difference between K values typically decreases as the assumed length L of the vehicle hitch bar 54 nears the actual L value. Knowing this, the processor 34 can adjust the assumed L value in subsequent iterations until the K values are the same. Once the actual L value has been determined, the processor 34 can solve equations 10-12 to determine the actual hitch angle value.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A hitch angle detection system comprising:
   ultrasonic transducers disposed on a rear vehicle structure and configured to transmit ultrasonic waves in a rearward vehicle direction;
   an ultrasonic reflector disposed on a trailer and configured to reflect incident ultrasonic waves back toward the corresponding ultrasonic transducers, the ultrasonic reflector comprising a trihedral reflector having a resonating cavity configured to amplify each reflected ultrasonic wave; and
   a processor configured to derive distance measurements between the ultrasonic transducers and the ultrasonic reflector and determine a hitch angle based on the derived distance measurements.

2. The system of claim 1, wherein the hitch angle is among a range of determinable hitch angles, the range of determinable hitch angles comprising −60 degrees to 60 degrees.

3. The hitch angle detection system of claim 1, wherein the ultrasonic reflector comprises a trihedral reflector having a resonating cavity for amplifying incident ultrasonic waves reflected back to the ultrasonic transducers.

4. The system of claim 1, wherein the ultrasonic transducers include first, second, third, and fourth ultrasonic transducers spaced along the rear vehicle structure such that the first and second ultrasonic transducers are located off to a first side of a longitudinal axis of the vehicle and the third and fourth ultrasonic transducers are located off to a second side of the longitudinal axis of the vehicle.

5. The system of claim 4, wherein the processor determines a negative hitch angle based on derived distance measurements between the ultrasonic reflector and each of the first and second ultrasonic transducers, a distance between the first and second ultrasonic transducers, a distance between the longitudinal axis and one of the first and second ultrasonic transducers, and a length of a vehicle hitch bar.

6. The system of claim 5, wherein the processor determines a positive hitch angle based on derived distance measurements between the ultrasonic reflector and each of the third and fourth ultrasonic transducers, a distance between the third and fourth ultrasonic transducers, a distance between the longitudinal axis and one of the third and fourth ultrasonic transducers, and the length of the vehicle hitch bar.

7. The system of claim 6, wherein the processor determines a zero hitch angle when each of the first, second, third, and fourth ultrasonic transducers receive reflected ultrasonic waves from the ultrasonic reflector.

8. A hitch angle detection system comprising:
   ultrasonic transducers disposed on a rear vehicle structure and configured to transmit ultrasonic waves in a rearward vehicle direction;
   an ultrasonic reflector disposed on a trailer and configured to amplify and reflect incident ultrasonic waves back toward the corresponding ultrasonic transducers; and
   a processor configured to derive distance measurements between the ultrasonic reflector and at least two of the ultrasonic transducers and determine a hitch angle based on the derived distance measurements.

9. The system of claim 8, wherein the hitch angle is among a range of determinable hitch angles, the range of determinable hitch angles comprising −60 degrees to 60 degrees.

10. The hitch angle detection system of claim 8, wherein the ultrasonic reflector comprises a trihedral reflector having a resonating cavity for amplifying incident ultrasonic waves reflected back to the ultrasonic transducers.

11. The system of claim 8, wherein the ultrasonic transducers include first, second, third, and fourth ultrasonic transducers spaced along the rear vehicle structure such that the first and second ultrasonic transducers are located off to a first side of a longitudinal axis of the vehicle and the third and fourth ultrasonic transducers are located off to a second side of the longitudinal axis of the vehicle.

12. The system of claim 11, wherein the processor determines a negative hitch angle based on derived distance measurements between the ultrasonic reflector and each of the first and second ultrasonic transducers, a distance between the first and second ultrasonic transducers, a distance between the longitudinal axis and one of the first and second ultrasonic transducers, and a length of a vehicle hitch bar.

13. The system of claim 12, wherein the processor determines a positive hitch angle based on derived distance measurements between the ultrasonic reflector and each of the third and fourth ultrasonic transducers, a distance between the third and fourth ultrasonic transducer, a distance between the longitudinal axis and one of the third and fourth ultrasonic transducers, and the length of the vehicle hitch bar.

14. The system of claim 13, wherein the processor determines a zero hitch angle when each of the first, second, third, and fourth ultrasonic transducers receive reflected ultrasonic waves from the ultrasonic reflector.

15. A hitch angle detection method comprising the steps of:
   transmitting ultrasonic waves in a rearward vehicle direction with ultrasonic transducers disposed on a rear vehicle structure;
   using an ultrasonic reflector on a trailer to amplify and reflect incident ultrasonic waves back toward the corresponding ultrasonic transducers;
   using a processor to derive distance measurements between the ultrasonic transducers and the ultrasonic reflector; and
   determining a hitch angle based on the derived distance measurements.

16. The method of claim 15, wherein the step of transmitting comprises spacing first, second, third, and fourth ultrasonic transducers along the rear vehicle structure such that the first and second ultrasonic transducers are located off to a first side of a longitudinal axis of the vehicle and the third and fourth ultrasonic transducers are located off to a second side of the longitudinal axis of the vehicle.

17. The method of claim 16, wherein the step of determining comprises determining a negative hitch angle based on derived distance measurements between the ultrasonic reflector and each of the first and second ultrasonic transducers, a distance between the first and second ultrasonic transducers, a distance between the longitudinal axis and one of the first and second ultrasonic transducers, and a length of a vehicle hitch bar.

18. The method of claim 17, wherein the step of determining further comprises determining a positive hitch angle based on derived distance measurements between the ultrasonic reflector and each of the third and fourth ultrasonic transducers, a distance between the third and fourth ultrasonic transducers, a distance between the longitudinal axis and one of the third and fourth ultrasonic transducers, and the length of the vehicle hitch bar.

19. The method of claim 18, wherein the step of determining further comprises determining a zero hitch angle when each of the first, second, third, and fourth ultrasonic transducers receive reflected ultrasonic waves from the ultrasonic reflector.

* * * * *